(12) United States Patent
Price

(10) Patent No.: US 6,480,184 B1
(45) Date of Patent: Nov. 12, 2002

(54) APPARATUS FOR ENTERING DATA INTO A COMPUTER

(75) Inventor: Travis L. Price, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 530 days.

(21) Appl. No.: 08/993,371

(22) Filed: Dec. 18, 1997

(51) Int. Cl.$^7$ .................................................. G09G 5/08
(52) U.S. Cl. ........................ 345/163; 345/161; 345/157
(58) Field of Search ............................. 345/161, 163, 345/157

(56) References Cited

U.S. PATENT DOCUMENTS

| | | | |
|---|---|---|---|
| 4,135,940 A | * 1/1979 | Ritchie | 364/200 |
| 4,488,017 A | * 12/1984 | Lee | 345/161 |
| 4,844,388 A | 7/1989 | Kuba et al. | 248/1 B |
| 4,923,259 A | 5/1990 | Bartok | 312/208 |
| 5,031,867 A | 7/1991 | Cotterill | 248/281.1 |
| 5,043,709 A | * 8/1991 | Kim | 345/161 |
| 5,045,842 A | * 9/1991 | Galvin | 345/161 |
| 5,074,511 A | 12/1991 | Wilson | 248/346 |
| 5,211,367 A | 5/1993 | Musculus | 248/279 |
| 5,219,136 A | 6/1993 | Hassel et al. | 248/118 |
| 5,375,800 A | 12/1994 | Wilcox et al. | 248/118.1 |
| 5,428,368 A | * 6/1995 | Grant | 345/163 |
| 5,443,237 A | 8/1995 | Stadtmauer | 248/441.1 |
| 5,446,481 A | * 8/1995 | Gillick et al. | 345/163 |
| 5,487,525 A | 1/1996 | Drabczyk et al. | 248/639 |
| 5,564,667 A | 10/1996 | Copeland et al. | 248/278.1 |
| 5,771,038 A | * 6/1998 | Wang | 345/163 |
| 5,847,695 A | * 12/1998 | Duncan et al. | 345/163 |
| 5,963,197 A | * 10/1999 | Bacon et al. | 345/163 |

OTHER PUBLICATIONS

"Bimodal Mouse," IBM Technical Disclosure Bulletin, vol. 29, No. 1, pp. 421–422, Jun. 1986.*

* cited by examiner

Primary Examiner—Richard Hjerpe
Assistant Examiner—Henry N. Tran
(74) Attorney, Agent, or Firm—Trop, Pruner & Hu, P.C.

(57) ABSTRACT

The invention, in one embodiment, is a computer pointing device that includes: (1) a housing; (2) a first depressible button supported by the housing which, when pressed, causes a first signal to be generated; (3) a second depressible button supported by the housing which, when pressed, causes a second signal to be generated; (4) a cable coupled to transmit the first signal and the second signal; and (5) a lever pivotably coupled to the housing at one end.

24 Claims, 11 Drawing Sheets

JIM WITH FEET EXTENDED

JIM WITH FEET RETRACTED

APPARATUS FOR ENTERING DATA INTO A COMPUTER

BACKGROUND OF THE INVENTION

1. Field of the Invention

The invention relates in general to inputting data using computer input/output (I/O) devices and, more particularly, to a pointing device.

2. Description of Related Art

A typical computer system (e.g., a personal computer or PC, or a workstation) includes input/output (I/O) devices, for example, a mechanical mouse, a trackball, a touchpad, a digitizing tablet, a stand-alone joystick, a touchscreen, or a light pen as a pointing or selection device. These devices may be used to send signals to the computer system to move a pointer (e.g., a cursor or arrow) displayed on a monitor screen of the system in a graphic or other interface of a software application running on the system. The devices send signals to the system to make a selection from amongst items or objects displayed in the application on the monitor. I/O devices may be serial or parallel and coupled to the computer through corresponding serial or parallel computer ports.

Many of these I/O devices have been ergonomically designed and produced, and include, for example, movable balls held underneath the device or a touchpad. When a user moves the device around on, for example, a mousepad, the ball rotates, and the motion of the ball is converted into a signal which is input to the computer to move the pointer about the screen of the computer. Using the ball design requires the user to have a fairly large open space ("real estate") on a surface, table, or desk on which to maneuver the device. If surface real estate is limited, such designs inefficiently use desktop space. The ball design also has exposed moving parts (e.g., the ball and its rotation sensors) that may become dirty or pick up lint/particles from the mousepad or desktop. Dirt may diminish the response and usefulness of such a device.

The touchpad eliminates the problem of lint/particles because it has no exposed moving parts, and it efficiently uses space. The touchpad, however, may not allow the sufficiently precise pointer positioning necessary for many programs, such as computeraided design ("CAD") programs. This is because of imprecision associated with sliding a finger on the touchpad as a means to move the pointer. The touchpad may also not appeal to the ergonomically aware and may not be the best tool for playing mouseenabled games.

The stand-alone joystick, which may be used with, for example, computer games, is coupled to an input serial port (e.g., a gameport) of the computer. A computer system having both a mouse and a stand-alone joystick would therefore require tying-up two of the system's ports. Moreover, the stand-alone joystick requires the computer to be programmed with a separate controller than a mouse controller, and a separate driver than a mouse driver.

In view of the above, there is a need for an I/O pointing device that provides multiple features and precise pointer positioning, does not require an inordinate amount of desktop real estate, does not unnecessarily tie up additional computer I/O ports, does not require a separate controller, and does not require a separate driver.

SUMMARY OF THE INVENTION

The invention, in one embodiment, is a computer pointing device that includes: (1) a housing; (2) a first depressible button supported by the housing which, when pressed, causes a first signal to be generated; (3) a second depressible button supported by the housing which, when pressed, causes a second signal to be generated; (4) a cable coupled to transmit the first signal and the second signal; and (5) a lever pivotably coupled to the housing at one end.

Figure 1:
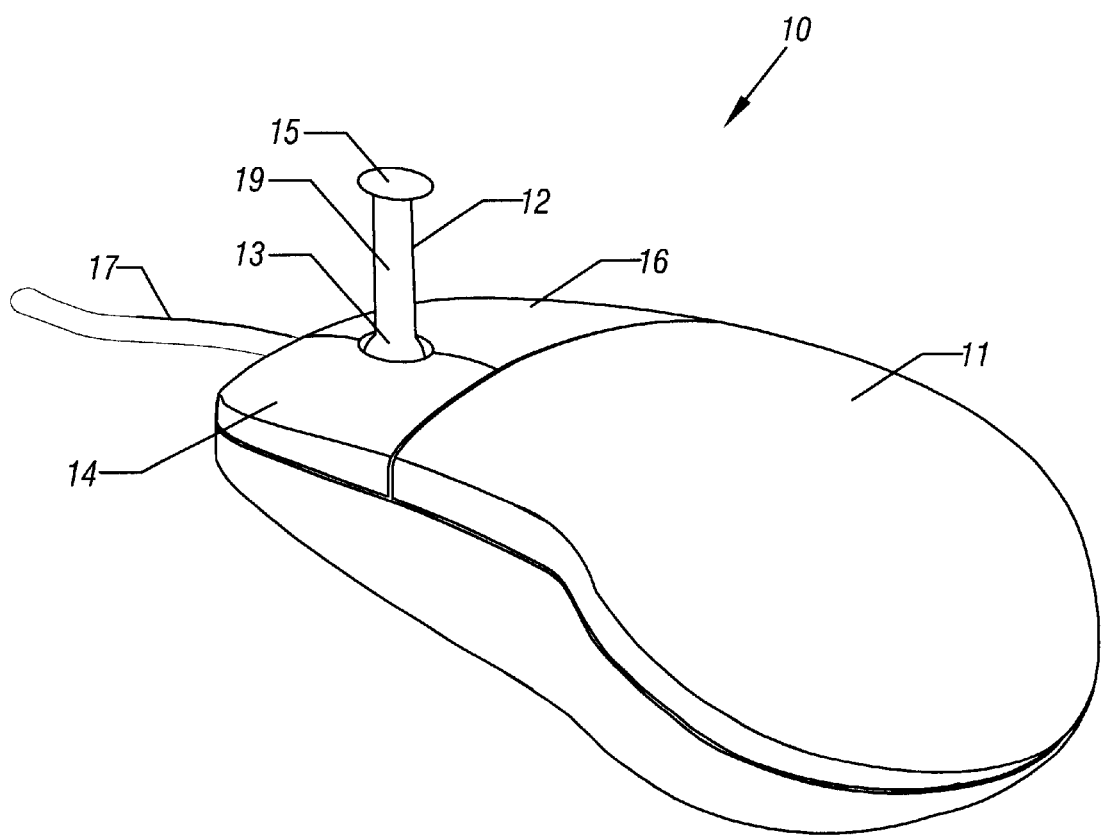
FIG. 1 shows a perspective view of a computer pointing device in accordance with a first embodiment of the invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DESCRIPTION OF ILLUSTRATIVE EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers'specific goals, such as compliance with system-related and business-related constraints, which will vary from one implementation to another. Moreover, it will be appreciated that, even if such a development effort might be complex and time-consuming, it would nevertheless be a routine undertaking for those of ordinary skill in the art having the benefit of this disclosure.

A First Embodiment of the Invention

Figure 2:
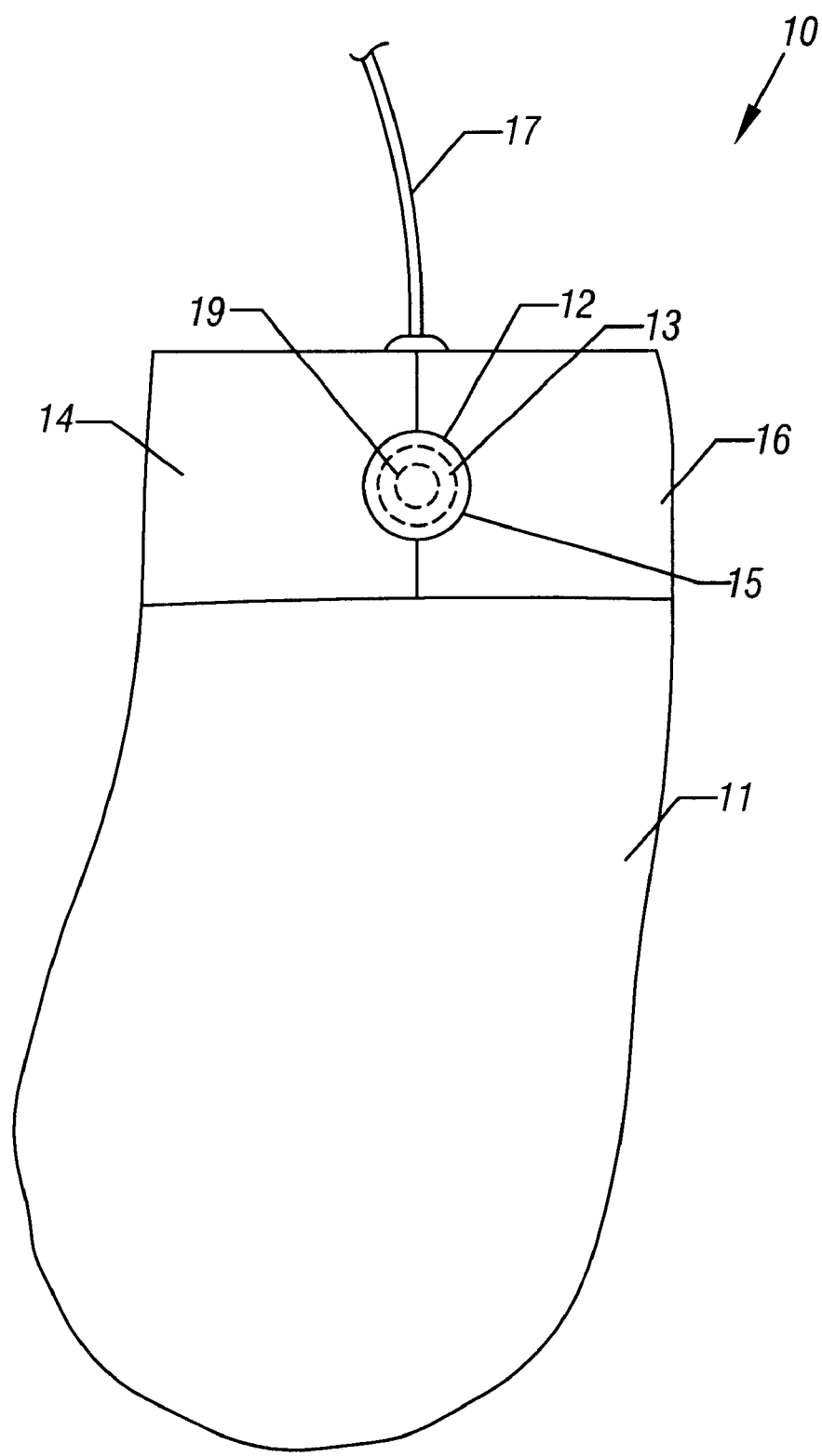
FIG. 2 shows a top view of the device in FIG. 1.

In accordance with a first embodiment of the invention, a computer pointing device or joystick integrated mouse (JIM) 10 is shown in a perspective view in FIG. 1 and a top view in FIG. 2. The JIM 10 includes a housing 11, a joystick or lever 12 (which may be elongated as shown), buttons 14 and 16, and a mouse cord, line, or cable 17. The housing mechanically supports the buttons 14 ("left mouse button") and 16 ("right mouse button"), as well as the lever 12. The lever 12 is mechanically coupled to the housing 11 at a pivot end 13. The pivot end 13 allows the lever 12 to be pivoted by a thumb or finger(s) touching an extended end 15, or along its shaft 19. The lever 12 may be positioned and supported by the housing 11 between the mouse buttons 14 and 16. The pivot end 13 may have any suitable structure and mechanism known in the art. For example, the pivot end 13 may be a ball in a ball and socket arrangement, with the socket formed in the housing 11.

The housing 11 encases electronic circuitry (not shown) for generating output signals responsive to the operation of the button 14, the button 16, and the lever 12. The design and implementation of such circuitry is well known in the art, although some modification may be desirable to facilitate including joystick and mouse functionality in the same device. Furthermore, the housing for a conventional mouse is principally designed to fit the contours of the user's hand rather than to house the electronic circuitry. The housing for a conventional mouse is therefore largely empty since the electronic circuitry for a conventional mouse is relatively compact. The housing 11 can therefore be implemented with conventional designs modified to accommodate the lever 12 and accompanying electronic circuitry.

The internal wiring for mouse and joystick functionality in the JIM 10, which transmits signals via the cord 17 to the computer (not shown), may be identical to that used for a conventional mouse and a stand-alone joystick, with one notable exception. The exception is that the wiring which carries signals in response to positioning the pointer/object/cursor on-screen with the lever 12 is coupled together within the JIM 10 to the wiring which carries signals in response to rotating the ball (discussed below) to position the pointer/object/cursor on-screen. From the point where the wiring is coupled to the computer (including the cord 17), there is no separate wiring to carry signals in response to moving the lever 12, or in response to moving the JIM 10 on a surface (e.g., on a mousepad) to rotate the ball (discussed below). No additional computer port is tied up when coupling the cable 17 to use the lever 12.

Figure 3:
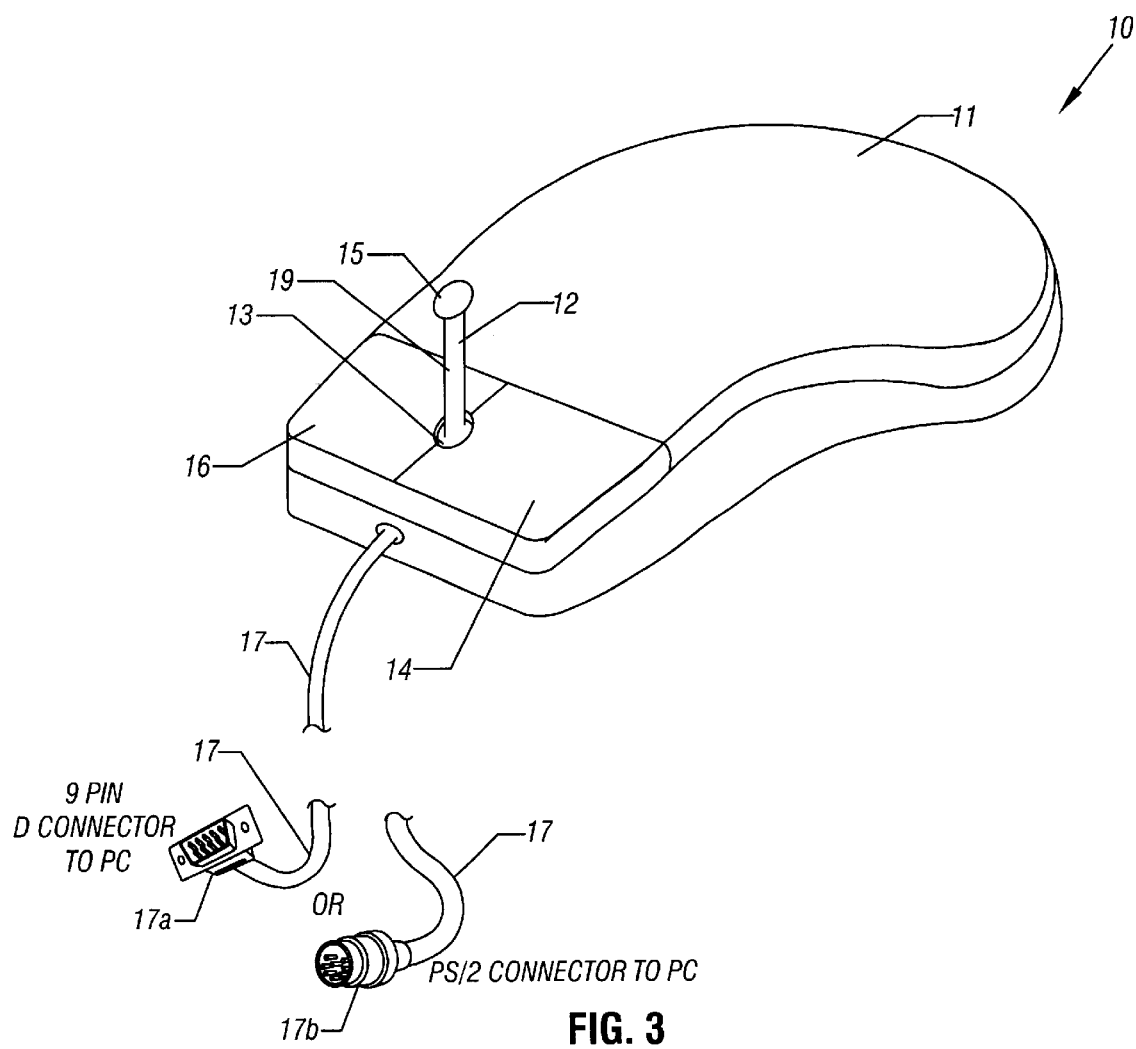
FIG. 3 shows connectors for the device in FIG. 1.

The JIM 10 includes features and functionality of both a computer mouse and a stand-alone joystick. For example, as shown in FIG. 3, the cord 17 may terminate in a terminal connector, for example, a standard 9-pin D connector 17a or a standard PS/2 connector 17b to couple to a corresponding I/O port of a PC or workstation (not shown). The cord 17 may also terminate in other types of connectors as would be appropriate for a particular computer system implementation.

The JIM 10 may also incorporate qualities of both the ball design and the touchpad. For example, the JIM 10 may be ergonomic, require little maneuvering space, and position and/or select screen pointers/objects/cursors very precisely in computer monitor on-screen displays provided by software applications running on the computer. The JIM 10 allows a user to precisely move the screen pointer without losing any of the functionality of a typical mouse. The lever 12 may be used to play games much as an ordinary stand-alone joystick, thus allowing the user to enjoy the benefits of the ordinary joystick without having to spend extra money on a separate device, tie up a game or other port, or require a separate controller or separate driver.

The buttons 14 and 16 have the same functionality as conventional mouse buttons which, when depressed, cause corresponding conventional left- and right-hand mouse button pointing and/or selection signals to be issued from the JIM 10 and transmitted via the cord 17 to the computer system to which it is coupled. These signals include signals for normal select and normal drag functions which are generated by depressing the button 14, and context menu and special drag functions which are generated by depressing the button 16. For example, buttons 14 and 16 may be used to send signals to the computer system to "click" or "double click" on objects or items, or to "drag and drop" objects or items, on-screen, much as a conventional mouse.

The "right-handed" JIM 10 shown in FIGS. 1 and 2 is designed to be used by right-handed users. It is understood, however, that an equivalent "left-handed" JIM 10 for left-handed users, having the same features, but with the positions of buttons 14 and 16 reversed and contoured for left-handed manipulation, is included in the instant invention. The left-handed implementation is simply not shown for purposes of limiting redundancy in the drawings.

A Second Embodiment of the Invention

Figure 4:
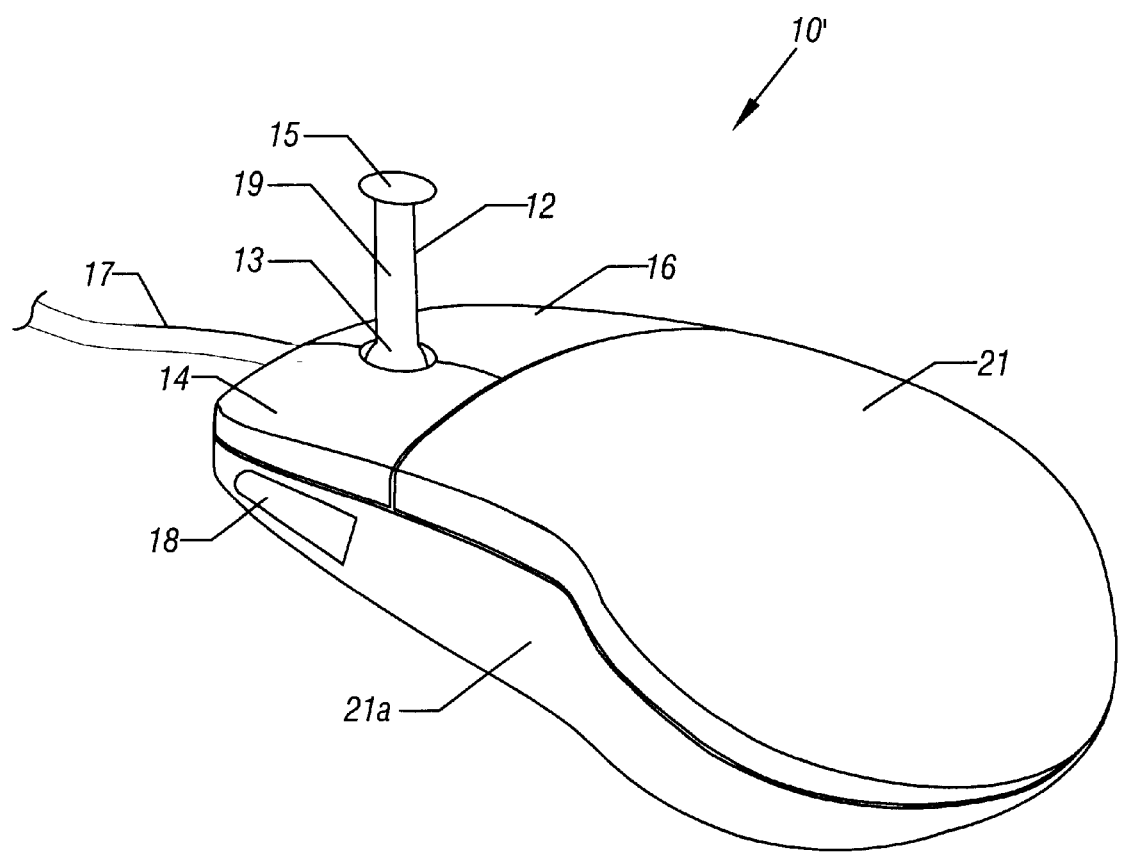
FIG. 4 shows a perspective view of another computer pointing device in accordance with a second embodiment of the invention.

A JIM 10' is shown in a perspective view in FIG. 4 in accordance with a second embodiment of the invention. The JIM 10' has all the features and functionality of the JIM 10 in FIGS. 1–3, but includes additionally a mouse button 18 which operates similar to, and has the same functionality as, the mouse button 14 (the "left-hand" mouse button). In FIG. 4, the mouse button 18 is located on the right-hand thumb side 21a of the device 10', and is mechanically supported on the side 21a by the housing 21 (the housing 21 is functionally analogous to the housing 11 of the JIM 10). A user may depress the button 18 instead of the button 14 to send the same or similar left button output signals to the computer (not shown) via cable 17.

Other than the additional button 18 and its coupling to the same circuitry (not shown) that generates these signals in the JIM 10', the JIM 10' has similar structural and connectivity features as the JIM 10 in FIGS. 1–3. As with the JIM 10, although the JIM 10' is depicted in the drawings as being "right-handed", it is understood that an equivalent "left-handed" JIM 10' is included in the instant invention with the positions of buttons 14 and 16 reversed.

When the mouse functionality of the JIMs 10 or 10' is being employed, the user's "mouse" hand (i.e., the hand manipulating the JIMs 10 or 10') may be positioned such that the lever 12 is located comfortably between the index and second fingers of the same hand. When the joystick functionality of the JIMs 10 or 10' is being employed, the user may simply place one finger (e.g., the index finger) on the lever 12 to position it, or hold the JIMs 10 or 10' with one hand and position the lever 12 with the index (or other) finger, or fingers, of the other hand. Such exemplary types of manipulation of the lever 12 may occur, for example, while the user is playing a computer game.

The button 18 of the JIM 10' may be disposed on the (left) side 21a(or corresponding right side for a "left-handed" JIM 10') to facilitate accessibility with the user's thumb. The user could use the index finger of the same hand to move (pivot) the lever 12 to control the position of a pointer/object/cursor on-screen. The button 18 may be depressed with the thumb to activate left-hand mouse button functionality while the index finger manipulates the lever 12. The lever 12 may be moved at its extended end 15 or anywhere along the length of its shaft 19. Alternatively, the user may wish to use any combination of fingers or thumbs of either hand to depress buttons 14, 16, or 18, and/or to move the lever 12 to position or make selections with the pointer/object/cursor onscreen while running software applications. Depressing the buttons 14 and 16 passes signals to the software application running on the computer. Depending on the number of times the buttons are depressed ("clicked") and the position of the pointer/object/cursor at the time of the clicks, the software application performs the task the user wants to accomplish. These software programs may or may not include a game having joystick input-control capability.

A Third Embodiment of the Invention

Figure 5A:
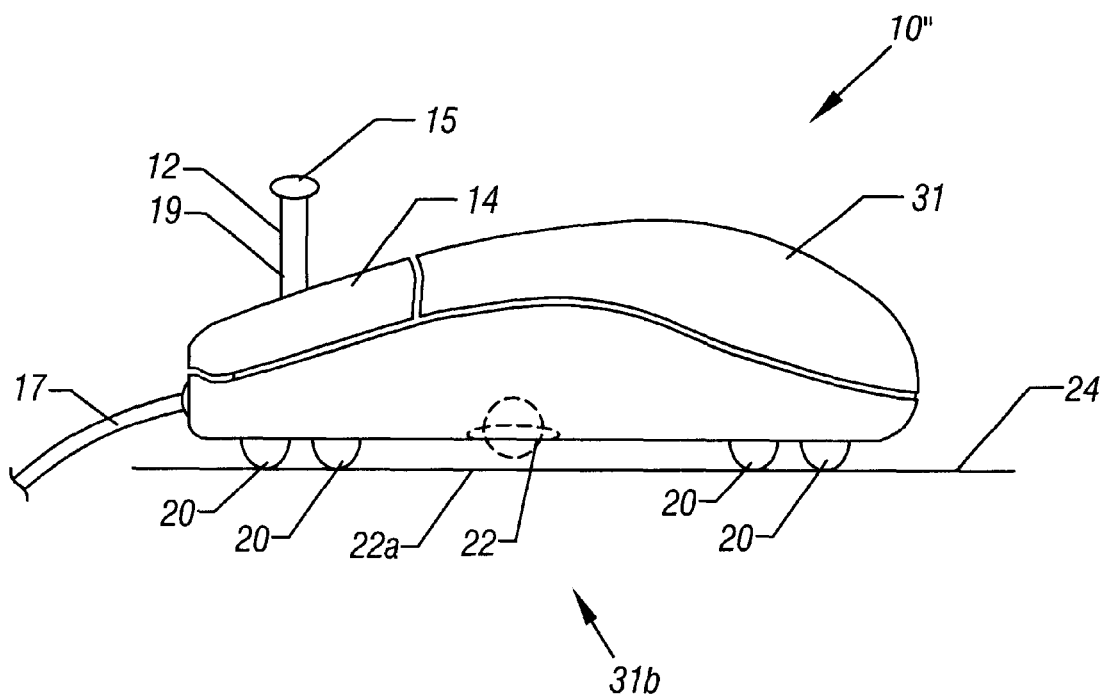
FIGS. 5a–5b show side views of another computer pointing device in accordance with a third embodiment of the invention.
Figure 5B:
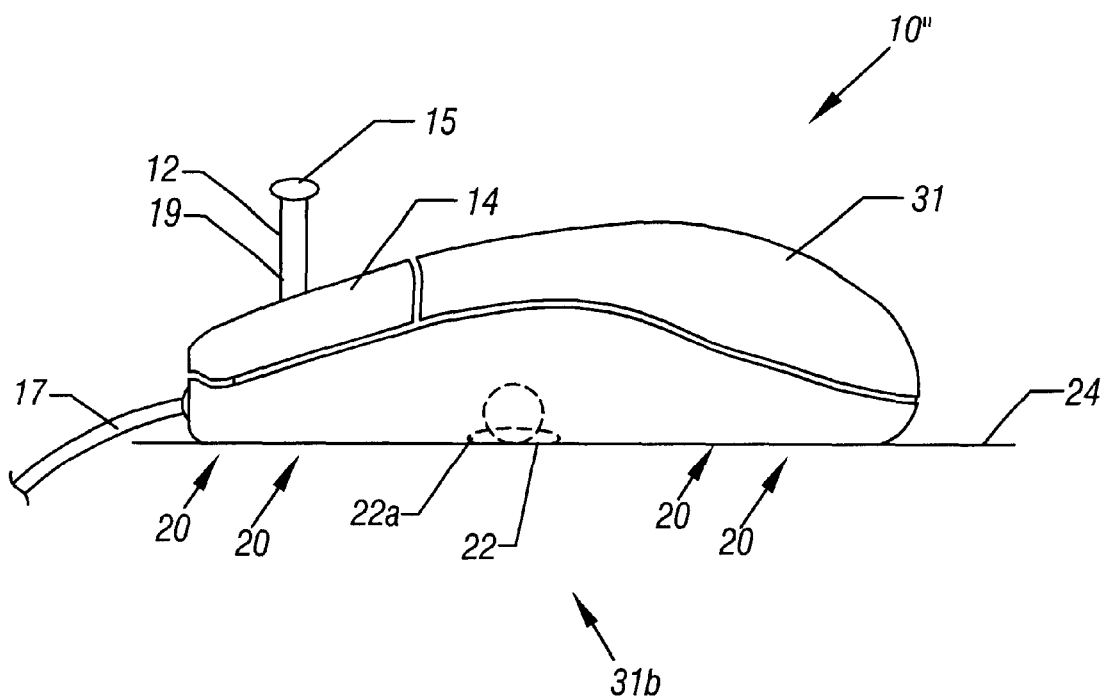
Figure 6:
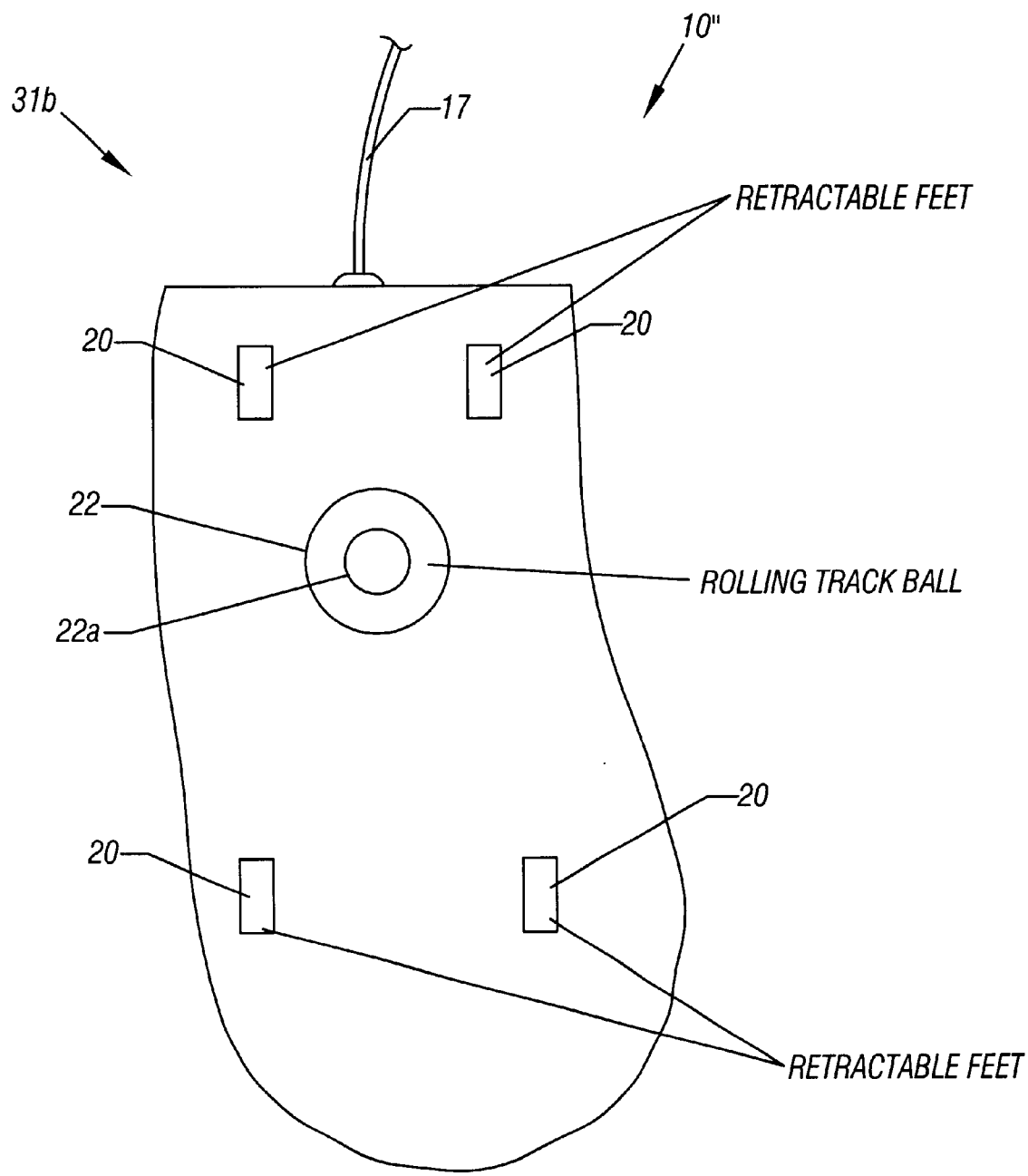
FIG. 6 shows a bottom view of the device in FIGS. 5a–5b.

FIGS. 5a–5b and 6 illustrate a third embodiment of the invention, JIM 10", employing retractable feet 20. Other than the feet 20, the JIM 10" includes all of the features and functionality of the JIM 10. As shown in FIGS. 5a–5b, although this particular embodiment does not include the side mouse button 18 as in the second embodiment (JIM 10') described above, the side mouse button 18 could be included along with its associated signal-generating and transmitting electronic circuitry (not shown). FIG. 5a shows the feet 20 in their extended position and FIG. 5b shows the feet 20 in their retracted position above a surface or desk 24.

Referring to FIG. 6, a view of an underside 31b of a housing 31 of the JIM 10" reveals the extendible/retractable "feet" 20 in their extended position (the housing 31 is functionally analogous to the housing 11 of the JIM 10). As shown in the side view in FIG. 5a, the feet 20 can be extended to disengage a ball 22a of a trackball unit 22 (shown best in FIG. 6) from the surface 24 to prevent rotation of the ball 22a and to provide stability while pivoting the lever 12. Extending the feet 20, as shown in FIG. 5a, disengages the trackball unit 22 from the surface 24 by raising the trackball unit 22 above the surface 24. As shown in FIG. 5b for the JIM 10", the feet 20, when retracted, allow the JIM 10" to be positioned to operate the trackball unit 22 to rotate the ball 22a on surface 24 when the JIM 10" is to be used as a conventional mouse device to move a pointer/object/cursor on-screen.

The structure and mechanism of the feet 20 may be of any suitable implementation known in the art. For example, each of the feet 20 could include opposed tabs or a rotatable shaft mounted in the housing 31 near the underside 31b which may be aligned along an axis (not shown) parallel to the surface 24 when the JIM 10" is placed on the surface 24. The user may simply "flip" each of the feet 20 down to lock in the extended position by rotating or pivoting each of the feet 20 about the axis (i.e., by rotating the opposed tabs or rotatable shaft about the axis with a force on the feet 20 such that each of the feet 20 move down and away from the underside 31b until fully extended). When the feet 20 are to be retracted, the user then "flips" or pivots each of the feet 20 back up from the locked position which rotates the opposed tabs or rotatable shaft about the axis in the opposite direction from that described above (i.e., the feet 20 are pushed toward the underside 31b until fully retracted). This implementation is merely exemplary and other structures and mechanisms could instead be used.

With the feet 20 retracted, the JIM 10" can be moved about the surface 24 and the rotation of the ball 22a in the trackball unit 22 will be converted to an electrical output signal carried by the cord 17 to the computer (not shown). The conversion, in general, involves the turning of two rollers (not shown) which touch the trackball 22a and which are mounted at a 90 degree angle to each other, as is known in the art. Each of these rollers is attached to a wheel or encoder (not shown). As the ball 22a rotates, it imparts the turning motion on the rollers, which turns the encoders. The encoders produce intermittent electrical signals as they turn. The more the ball 22a is rotated, the more of these signals are produced, and the number of signals is indicative of how far the ball 22a has been rotated (which corresponds to how far the JIM 10"[or 10 or 10'] have been moved, for example, on the surface 24). The direction in which the rollers turn and the ratio between the number of signals from the rollers is an indication of the direction in which the mouse is moved.

Figure 7A:
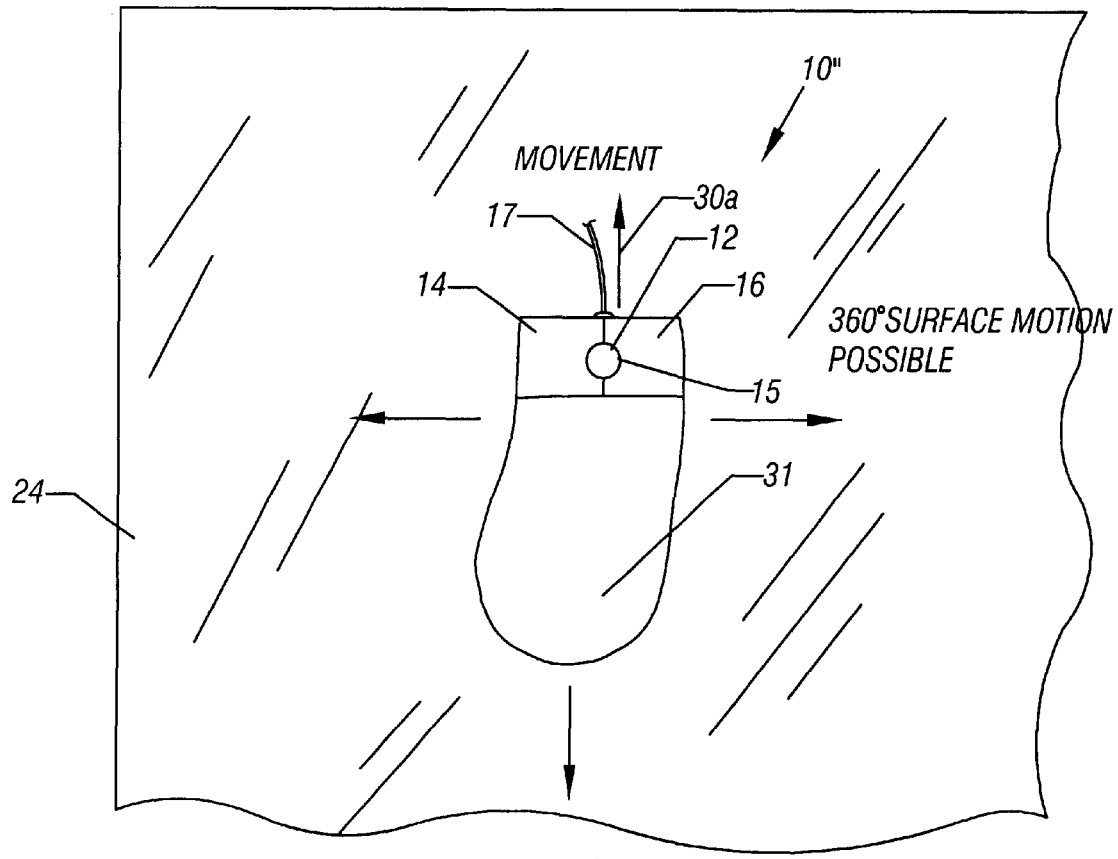
FIG. 7a illustrates the possible range of motion of the computer pointing device in FIGS. 5a–5b and 6 on a surface.

Signals corresponding to the number of intermittent signals produced by the encoders, to the ratio, and to the frequency of signals from the two encoders, are sent via the cord 17 to the software application running on the computer to be converted to distance, direction, and speed required to move the on-screen pointer/object/cursor (i.e., for normal mouse operation). FIG. 7a schematically shows the directions from a top view perspective in which the JIM 10" may be moved by a user on the surface 24 with the feet 20 (not shown in FIG. 7a) retracted. Like a conventional mouse, the JIM 10" may be moved linearly or in two dimensions (for mouse operation) with 360° of motion possible on the surface 24. Although FIG. 7a shows the directions of possible motion for the JIM 10", it is to be understood that either of the first or second embodiments (i.e., the JIMs 10 and 10') will have the same capability (except there are no feet 20).

On the other hand, for the JIM 10", with the feet 20 extended, the trackball 22a of the trackball unit 22 does not touch the surface 24, thus rendering it inoperative. This allows the lever 12 to be used to move the pointer/object/cursor on-screen without interference from, or competing with, the trackball 22a. This is in contrast to when the feet 20 are retracted, where the lever 12 could also be used to move the pointer/object/cursor on-screen in addition to being movable by rotation of the ball 22a. Extending the feet 20 also allows the pointer/object/cursor to be moved on-screen with the lever 12 without excessive surface 24 real estate being needed.

Figure 7B:
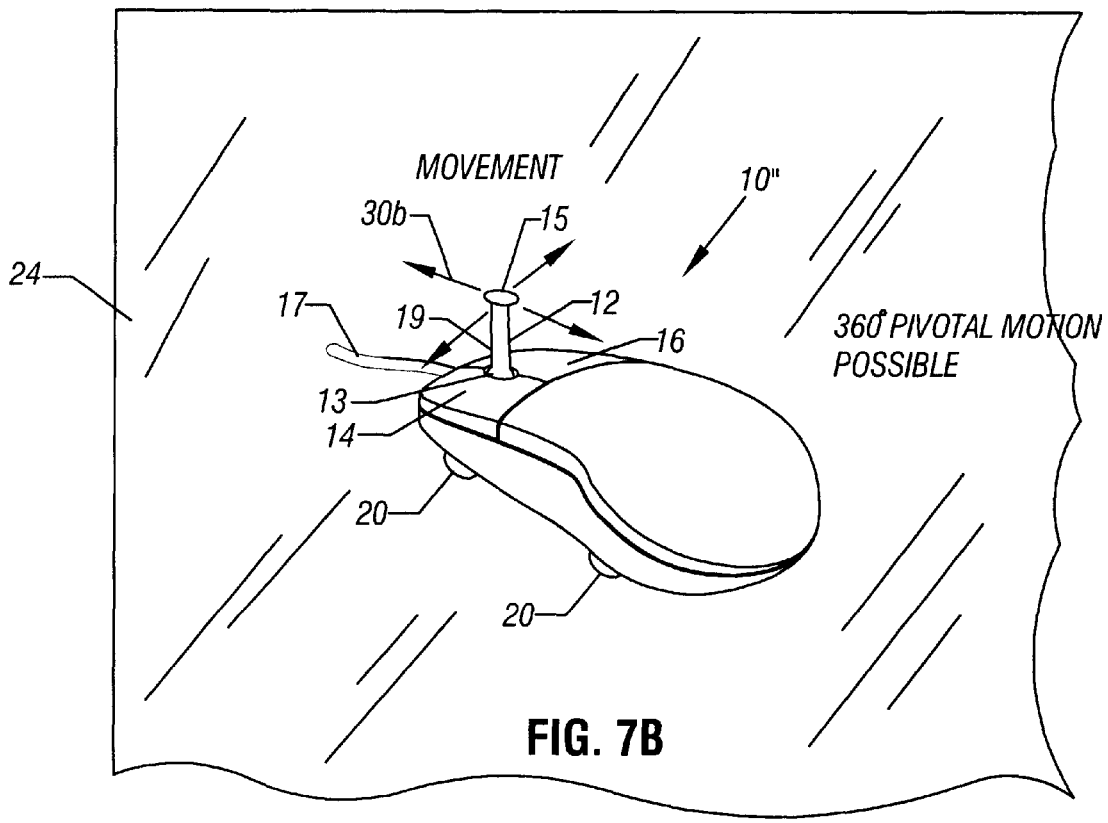
FIG. 7b shows a representation of possible directions of pivotal motion of a portion of the computer pointing device in FIGS. 5a–5b and 6.

FIG. 7b schematically shows the directions (also similar for JIMs 10 and 10') in which the lever 12 may be moved by the user. In FIG. 7b, the feet 20 are in their extended position (only two of the typically four feet 20 are visible in FIG. 7b, although three or another number are also possible). It is not necessary that the feet 20 be extended, although, if they are extended, the likelihood of the JIM 10" slipping on the surface 24 when the lever 12 is manipulated is reduced compared to when the feet 20 are retracted. Like a conventional stand-alone joystick, the lever 12 may be pivoted linearly or pivoted in two dimensions about its pivot end 13 to move the pointer/object/cursor on-screen. Close to a half-sphere of motion of the lever 12 may be possible about the pivot end 13. Moving the lever 12 forward along the direction of arrow 30b in FIG. 7b produces the same output signal carried by cable 17 to the computer as when rolling the mouse forward along the direction of arrow 30a in FIG. 7a (i.e., in the same or a corresponding direction). The same is true for all other corresponding directions on the surface 24. Similar motion is also possible for the lever 12 of the JIMs 10 and 10'.

The lever 12 will continue to produce the output signal carried by cable 17 to the computer to move the pointer/object/cursor as long as the lever 12 is pivoted out of its nominally centered position (i.e., its neutral or vertical position) if the lever 12 acts as a pointer/object/cursor relative on-screen position joystick (i.e., as a relative position joystick). Alternatively, the lever 12 could be designed to act as an absolute position joystick in which the position of the lever 12 corresponds to an absolute position onscreen. This is in contrast to when the JIM 10"(or 10 or 10') operates as a normal mouse in which a corresponding output signal will only continue to be produced if the ball 22*a* is rotated (i.e., when the user pushes the JIM 10"[or 10 or 10'] on the surface 24), because the encoder signals continue to be produced, as discussed.

A Fourth Embodiment of the Invention

Figure 8:
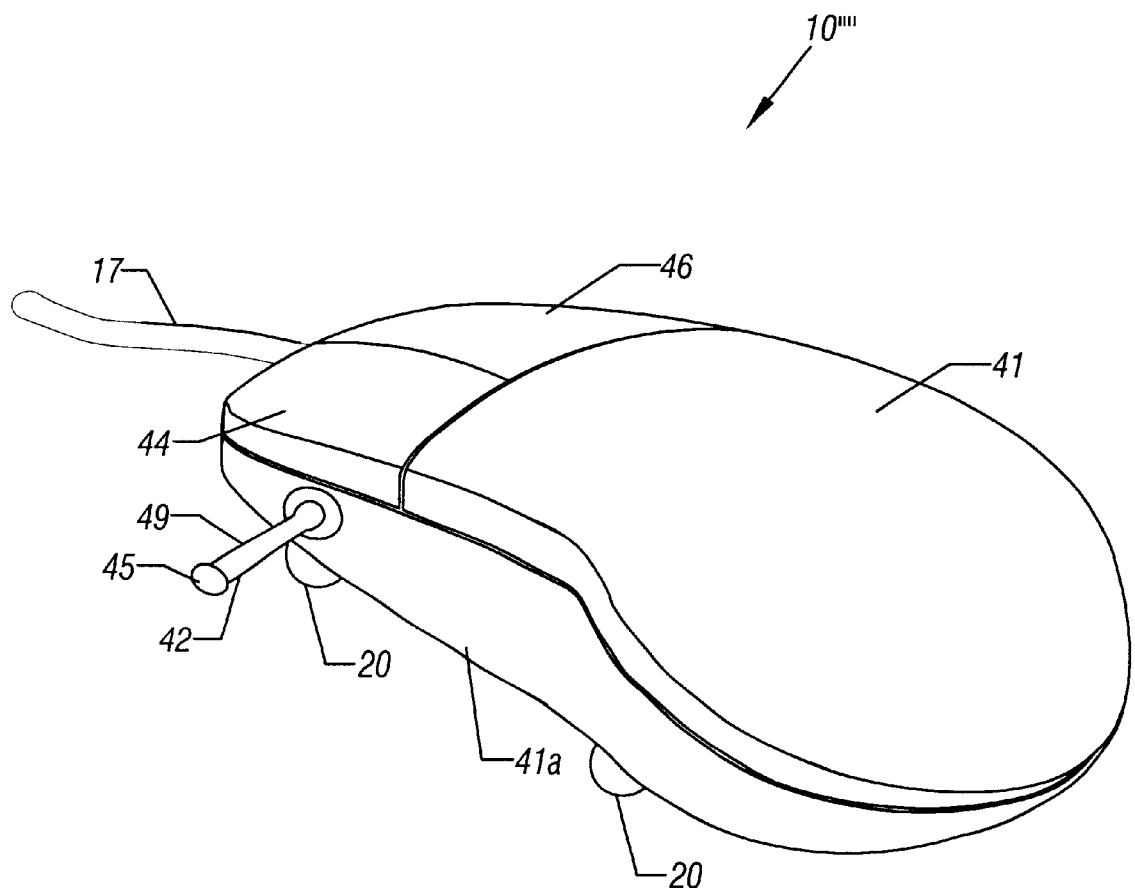
FIG. 8 shows a perspective view of another computer pointing device in accordance with a fourth embodiment of the invention.

Referring to FIG. 8, in accordance with a fourth embodiment of the invention, a JIM 10''' is shown in a perspective view. The JIM 10''' includes a joystick 42 which is positioned on a side 41*a* of a housing 41 and supported by the housing 41. The housing 41 is functionally analogous to the housing 11 of the JIM 10.

The joystick 42 is coupled at a pivot end 43 to the housing 41 and has an extended end 45 distal from the pivot end 43 along a shaft 49, the lever 42 and both ends 43 and 45 being functionally analogous to the lever 12 and ends 13 and 15, respectively, of the JIM 10 (or 10' or 10"). The joystick 42 has all the pointer/object/cursor pointing and moving functionality of the joystick 12 of the JIM 10 (or 10' or 10"). The joystick 42 has circuitry similar to that of the joystick 12 which is used to output signals controlling the pointer/object/cursor position, as carried by the cable 17, to the computer system (not shown).

A left-hand mouse button 44 and a right-hand mouse button 46 are included in the JIM 10''' which are analogous to, and have similar functionality as, the left-hand mouse button 14 and the right-hand mouse button 16, respectively, of the JIM 10 (or 10' or 10"). The JIM 10''' may also include extendible/retractable feet 20 like the JIM 10". Only two of the typically four feet 20 are visible in their extended position in FIG. 8, although three, none, or another number are also possible.

In typical use, a user's hand would be placed on the JIM 10''' such that his or her thumb could manipulate the joystick 42 (although a finger could also be used). The lefthand and right-hand mouse button functionality would be accessible to the user by depressing the buttons 44 and 46 with the index and second fingers, respectively, or with thumbs, or even other fingers. The user also may manipulate the joystick 42 with or without depressing the buttons 44 and 46 with any finger or thumb as he or she pleases.

Method of Entering Data Using the JIM as a Pointing Device

The remaining discussion focuses on methods of entering data into a computer using the JIMs 10, 10', 10", or 10'''. Variations of these methods are depicted as flowcharts in FIGS. 9, 10, and 11. The present invention, however, is not limited to the orders in the methods described in FIGS. 9–11, which may be changed according to the desires or needs of the user. In view of the above description, it should be understood that, according to these and other possible methods, the JIMs 10, 10', 10" and 10''' may be used as a mouse device, as a joystick device, or as a combination of both, for on-screen control of the pointer/object/cursor in a graphic interface provided in software applications running on the computer system, where the pointer/object/cursor is mouse controllable.

Figure 9:
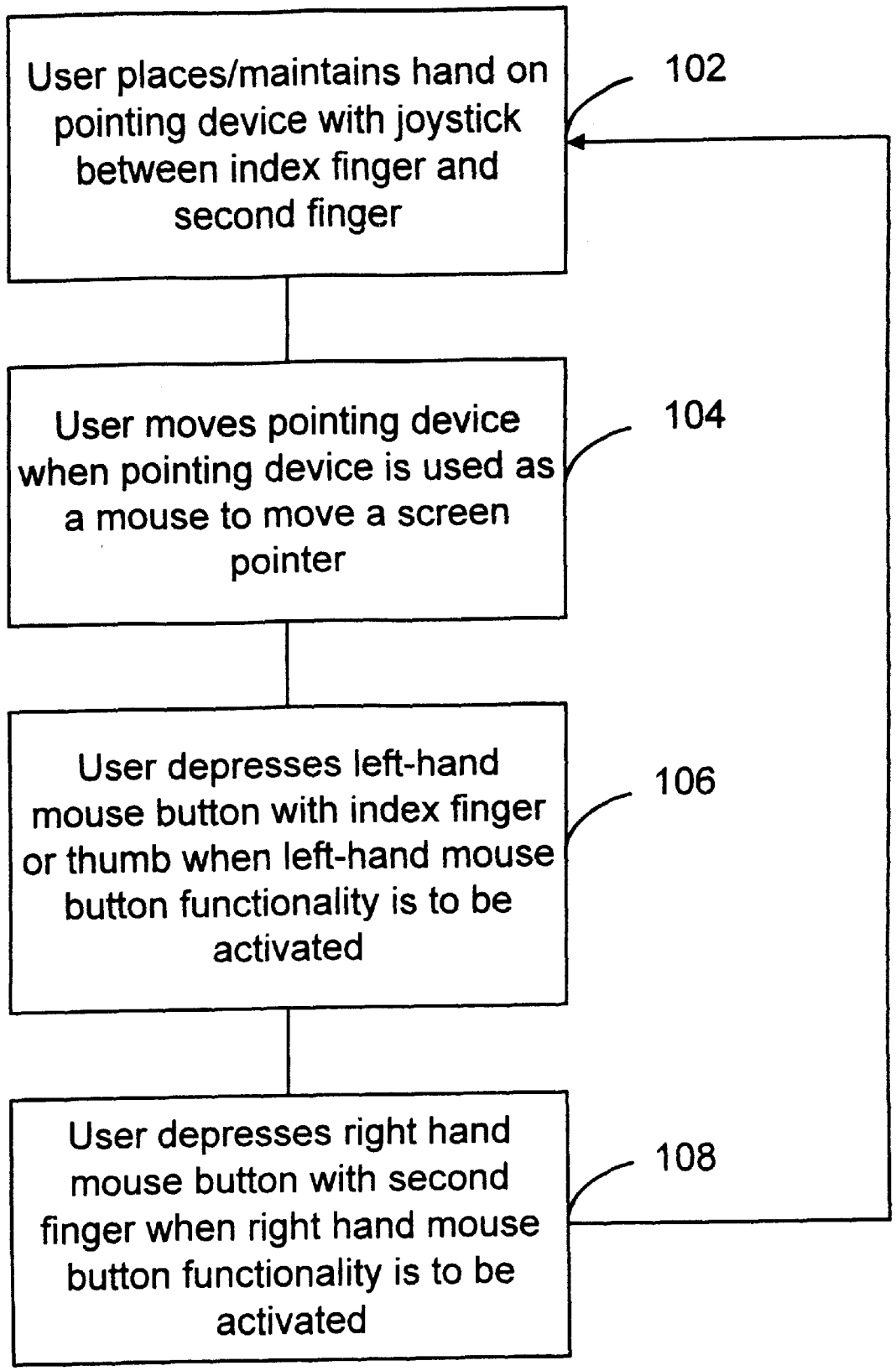
FIG. 9 is a flowchart of a method in accordance with an embodiment of the invention.

Referring to FIG. 9, a flowchart of a method (a "mouse" method), in accordance with an embodiment of the invention, is shown. The "mouse" method provides for the user to place/maintain as in block 102 his or her hand on the pointing device 10, 10', or 10" with the lever 12 between the user's index finger and second finger. The user moves as in block 104 the pointing device 10, 10' or 10" around as a mouse when the screen pointer/object/cursor is to be moved. The user depresses as in block 106 the left-hand mouse button 14 or 18 when the left-hand mouse button functionality is to be activated, and the user depresses as in block 108 the right-hand mouse button 16 with the second finger when the right-hand button functionality is to be activated.

Figure 10:
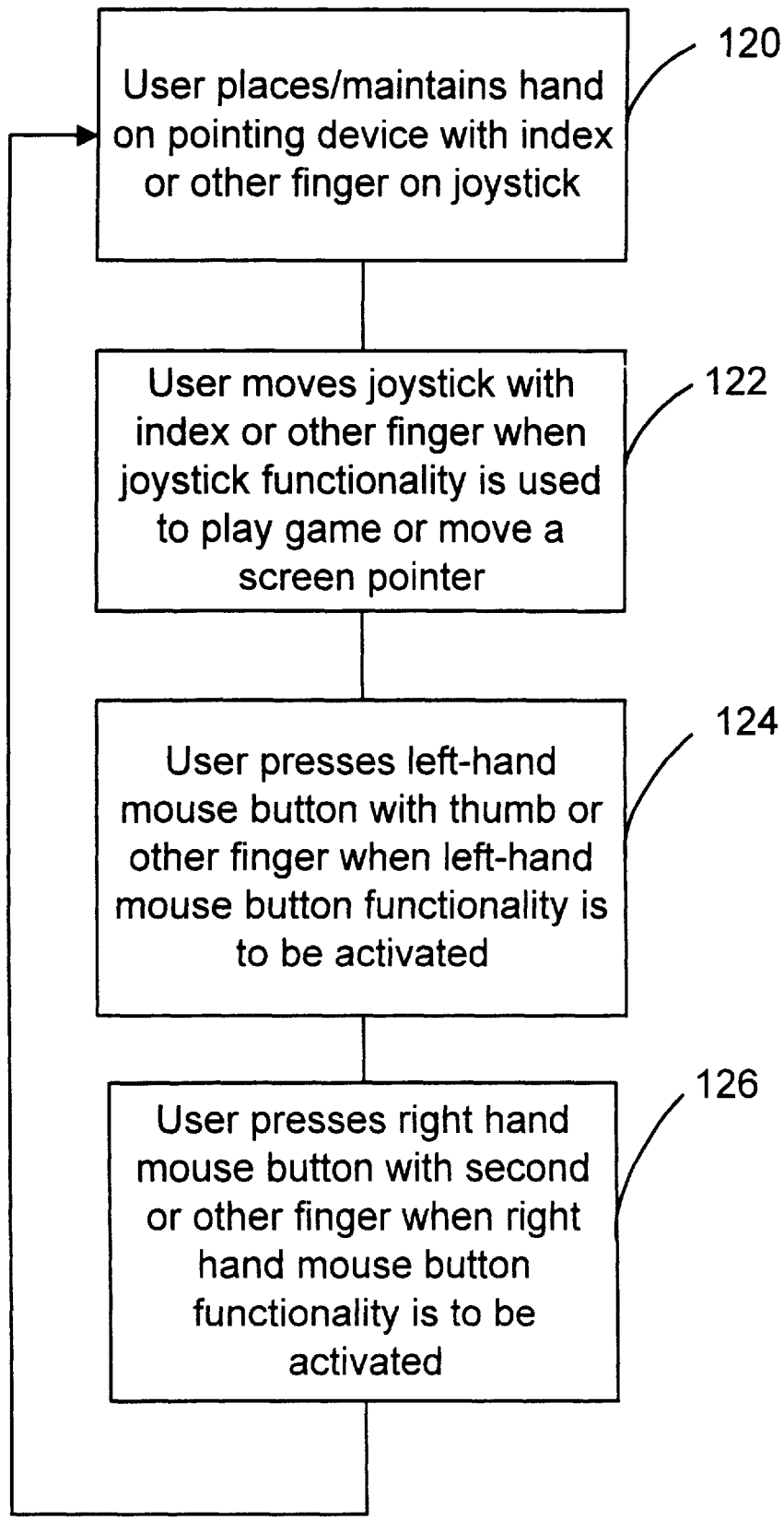
FIG. 10 is a flowchart of another method in accordance with an embodiment of the invention.

Another flowchart of a method (a "joystick" method), in accordance with an embodiment of the invention, is shown in FIG. 10. The "joystick" method provides for the user to place/maintain as in block 120 his or her hand on the pointing device 10, 10' or 10" with his or her index or other finger on the lever 12. The user moves as in block 122 the lever 12 with his or her index or other finger when a game is to be played or when the screen pointer/object/cursor is to be moved. The user presses as in block 124 the lefthand mouse button 14 or 18 with his or her thumb or other finger when the left-hand mouse button functionality is to be activated, and the user presses as in block 126 the right-hand mouse button 16 with his or her second or other finger when the right-hand mouse button functionality is to be activated. The process may repeat by going back to block 120.

Figure 11:
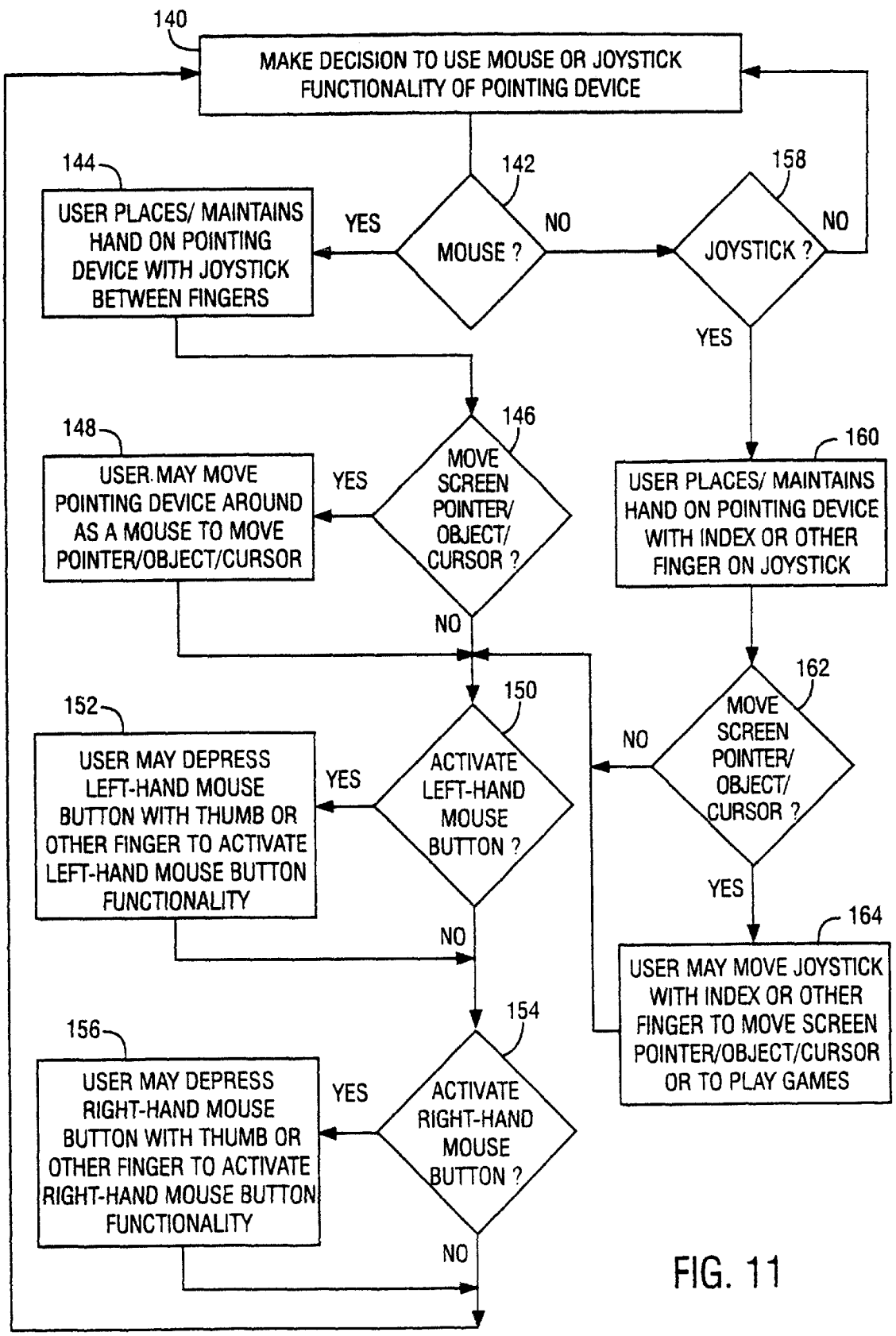
FIG. 11 is a flowchart of another method in accordance with an embodiment of the invention.

An additional flowchart of a method (a "mouse/joystick" method), in accordance with an embodiment of the invention, is illustrated in FIG. 11. In the "mouse/joystick" method, the user makes as in block 140 a decision to use either mouse or joystick functionality of the pointing device 10, 10' or 10". If the user chooses as in block 142 mouse functionality, the user may place/maintain as in block 144 his or her hand on the pointing device 10, 10' or 10" with the lever 12 between his or her fingers. If the screen pointer/object/cursor is to be moved as in block 146, the user may move as in block 148 the pointing device 10, 10' or 10" around as a mouse to produce a corresponding signal carried by the cord 17 to the computer to move or select the screen pointer/object/cursor. If the screen pointer/object/cursor is not to be moved, or once it has been moved, it is determined if the left-hand mouse button is to be activated as in block 150.

If the left-hand mouse button 14 or 18 is to be activated (e.g., by depressing it), the user may depress as in block 152 the left-hand mouse button 14 or 18 to activate lefthand mouse button functionality. If, on the other hand, the left-hand mouse button is not to be activated, or if it already has been activated, it is determined if the right-hand mouse button is to be activated (i.e., by depressing it) as in block 154. If the right-hand mouse button is to be activated, the user may depress as in block 156 the right-hand mouse button 16 with his or her second or other finger to activate right-hand mouse button functionality. If, however, the right-hand mouse button is not to be activated, or once it has been activated, the process returns to block 140 for the user to make a decision whether to invoke mouse or joystick functionality of the pointing device 10, 10', or 10".

At this point, if the user decides not to use the mouse, or if the user decided previously not to use the mouse, and, instead, decided to use the lever 12 as in block 158, the user may place/maintain as in block 160 his or her hand on the pointing device 10, 10', or 10" with his or her index or other finger on the lever 12. If the user decided not to use the lever 12, then the process proceeds back to block 140. If, however, it is determined that the screen pointer/object/cursor is to be moved as in block 162 with the lever 12, the user may move as in block 164 the lever 12 with his or her index or other finger or thumb to move the screen pointer/object/cursor, or to play a game. If, on the other hand, the screen pointer/object/cursor is not to be moved, or after it has been moved, the process proceeds to determine if the left-hand mouse button 14 or 18 is to be activated as in block 150. The process then proceeds as described above.

Remarks

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A computer pointing device, comprising;

housing;

a mouse component enclosed within the housing, the mouse component adapted to generate a signal representing movement of the pointing device in a plane; and a lever pivotably coupled to the housing at one end, the lever adapted to generate the signal when the lever is disturbed from a neutral position.

2. The computer pointing device of claim 1, wherein the lever is adapted to be disturbed from the neutral position by a finger or thumb of a user.

3. The computer pointing device of claim 1, wherein the lever comprises a joystick.

4. The computer pointing device of claim 1, wherein the lever is disposed generally upward from the housing.

5. The computer pointing device of claim 1, wherein the lever is disposed generally to the side of the housing.

6. The computer pointing device of claim 1, further comprising:

an underside of the housing, said underside exposing a ball, the ball being one element of the mouse component, the ball adapted to roll in response to movement of the pointing device in the plane; and feet extendible and retractable from the underside of the housing.

7. The computer pointing device of claim 6, wherein the housing is raised from a surface when said feet are extended.

8. The computer pointing device of claim 1, wherein the pointing device is contoured to fit a palm of a hand of a user.

9. The computer pointing device of claim 1, wherein the lever is adapted to be pivotable 360 degrees from the neutral position.

10. The computer pointing device of claim 1, further comprising a first depressible button supported by the housing, the first depressible button adapted to generate a first button signal when the first button is depressed.

11. The computer pointing device of claim 1, further comprising a second depressible button supported by the housing, the second depressible button adapted to generate a second button signal when the second button is depressed.

12. The computer pointing device of claim 11, further comprising a means for operatively coupling each of the signal, the first button signal and the second button signal to a computer system.

13. The computer pointing device of claim 12, the means for operatively coupling is selected from the group consisting of a cable, an infrared interface and a radio frequency interface.

14. The computer pointing device of claim 11, further comprising a third depressible button supported by the housing which, when depressed, causes the first button signal to be generated.

15. The computer pointing device of claim 14, wherein the pointing device further comprises a cable for operatively coupling each of the signal, the first button signal and the second button signal to a computer system.

16. The computer pointing device of claim 1, further comprising a means for operatively coupling the signal to a computer system.

17. The computer pointing device of claim 16, wherein the means for operatively coupling is selected from the group consisting of a cable, an infrared interface and a radio frequency interface.

18. A computer pointing device comprising:

a mouse adapted to generate a motion signal representing movement of the pointing device in a plane, the mouse including:

a first depressible button which, when depressed, cause a first button signal to be generated, a second depressible button which, when depressed, cause a second button signal to be generated;

a joystick operably mounted to the mouse which, when activated causes the motion signal to be generated; and a cable adapted to operatively couple the motion signal, the first signal, and the second signal to another device.

19. The computer pointing device of claim 18, further comprising a third depressible button supported by the mouse which, when depressed, causes the first button signal to be generated.

20. The computer pointing device of claim 18, wherein the joystick is disposed generally upward from the mouse.

21. The computer pointing device of claim 18, wherein the joystick 2 is disposed generally to the side of the mouse.

22. The computer pointing device of claim 18, wherein the mouse further includes a plurality of feet extendible and retractable from an underside thereof.

23. The computer pointing device of claim 22, wherein the feet are adapted to raise the device from a surface when extended.

24. The computer pointing device claim 18, wherein the device is contoured to fit a palm of a hand of a user.

* * * * *

UNITED STATES PATENT AND TRADEMARK OFFICE
CERTIFICATE OF CORRECTION

PATENT NO.    : 6,480,184 B1
DATED         : November 12, 2002
INVENTOR(S)   : Travis L. Price It is certified that error appears in the above-identified patent and that said Letters Patent is hereby corrected as shown below:

Column 9,
Line 48, "1" should be -- 10 --.

Column 10,
Line 3, after "12," insert -- wherein --.

Signed and Sealed this

First Day of April, 2003

JAMES E. ROGAN
*Director of the United States Patent and Trademark Office*